United States Patent
Asher et al.

(10) Patent No.: US 8,612,674 B2
(45) Date of Patent: Dec. 17, 2013

(54) SYSTEMS AND METHODS FOR CONCURRENTLY ACCESSING A VIRTUAL TAPE LIBRARY BY MULTIPLE COMPUTING DEVICES

(75) Inventors: Kai A. G. Asher, Tucson, AZ (US); Howard N. Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 12/957,566

(22) Filed: Dec. 1, 2010

(65) Prior Publication Data
US 2012/0144107 A1    Jun. 7, 2012

(51) Int. Cl.
*G06F 13/14*     (2006.01)

(52) U.S. Cl.
USPC ........... 711/111; 711/161; 711/203; 711/206; 703/24; 360/133

(58) Field of Classification Search
USPC .................... 711/111, 161, 203, 206; 703/24; 360/133
See application file for complete search history.

(56) References Cited

U.S. PATENT DOCUMENTS

| | | | |
|---|---|---|---|
| 5,606,685 A * | 2/1997 | Frandeen | 711/117 |
| 6,556,998 B1 * | 4/2003 | Mukherjee et al. | 1/1 |
| 7,162,604 B1 | 1/2007 | Nourmohamadian et al. | |
| 2007/0235537 A1 * | 10/2007 | Yoneda et al. | 235/435 |
| 2008/0162813 A1 | 7/2008 | Haustein et al. | |
| 2009/0063765 A1 | 3/2009 | Kottomtharayil et al. | |

* cited by examiner

*Primary Examiner* — Jae Yu
(74) *Attorney, Agent, or Firm* — Griffiths & Seaton PLLC

(57) ABSTRACT

Virtual tape libraries (VTLs) and methods for concurrently accessing a VTL are provided. One VTL includes memory partitioned into multiple volumes, multiple virtual drives, and a processor. The processor is configured to enable multiple applications to concurrently access a virtual storage volume in a first or second access mode. One method includes receiving a first request for a first application to access a virtual storage volume to write data to or read data from the virtual storage volume and granting the first request. The method further includes receiving a second request for a second application to concurrently access the virtual storage volume to write data to or read data from the virtual storage volume, determining if the first and second requests are compatible, and accepting or denying the second request based on the determination. Also provided are physical computer storage mediums including computer code for performing the above method.

17 Claims, 3 Drawing Sheets

SYSTEMS AND METHODS FOR CONCURRENTLY ACCESSING A VIRTUAL TAPE LIBRARY BY MULTIPLE COMPUTING DEVICES

BACKGROUND OF THE INVENTION

1. Field of the Invention

The present invention relates in general to storage systems, and particularly to, systems and methods for concurrently accessing a virtual tape library by a plurality of requestors.

2. Description of the Related Art

Contemporary virtual tape libraries (VTLs) are typically connected to multiple computing devices, but only allow one requestor (e.g., an application or host) at a time to access (e.g., an exclusive access) each virtual storage volume stored in the VTL. That is, only one requestor at a time is able to read data from and/or write data to a particular virtual storage volume. Since multiple requestors often desire to access a particular virtual storage volume at the same time, contemporary VTLs are not as efficient as they otherwise could be because access is granted serially to the requestors.

SUMMARY OF THE INVENTION

Various embodiments provide a virtual tape library (VTL) in communication with a plurality of applications via one or more hosts. One VTL comprising memory partitioned into a plurality of virtual storage volumes, a plurality of virtual drives coupled to the memory, and a processor coupled to the memory and the plurality of virtual drives. In one embodiment, the processor is configured to enable each application to concurrently access a virtual storage volume via one of the plurality of virtual drives in a first access mode or a second access mode.

Other embodiments provide methods for concurrently accessing a VTL in communication with a plurality of applications via one or more hosts, wherein the VTL comprises memory partitioned into a plurality of virtual storage volumes, a plurality of virtual drives coupled to the memory, and a processor coupled to the memory and the plurality of virtual drives. One method comprises receiving, by the processor, a first request for a first application to access a virtual storage volume to write data to or read data from the virtual storage volume and granting the first request. The method further comprises receiving, by the processor, a second request for a second application to concurrently access the virtual storage volume to write data to or read data from the virtual storage volume, determining if the first request and the second request are compatible requests, and accepting or denying the second request based on the determination.

Also provided are physical computer storage mediums (an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for concurrently accessing a virtual tape library (VTL) in communication with a plurality of applications via one or more hosts, wherein the VTL comprises memory partitioned into a plurality of virtual storage volumes, a plurality of virtual drives coupled to the memory, and a processor coupled to the memory and the plurality of virtual drives. One physical computer storage medium comprises computer code for receiving, by the processor, a first request for a first application to access a virtual storage volume to write data to or read data from the virtual storage volume and computer code for granting the first request. The physical computer storage medium further comprises computer code for receiving, by the processor, a second request for a second application to concurrently access the virtual storage volume to write data to or read data from the virtual storage volume, computer code for determining if the first request and the second request are compatible requests, and computer code for accepting or denying the second request based on the determination.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
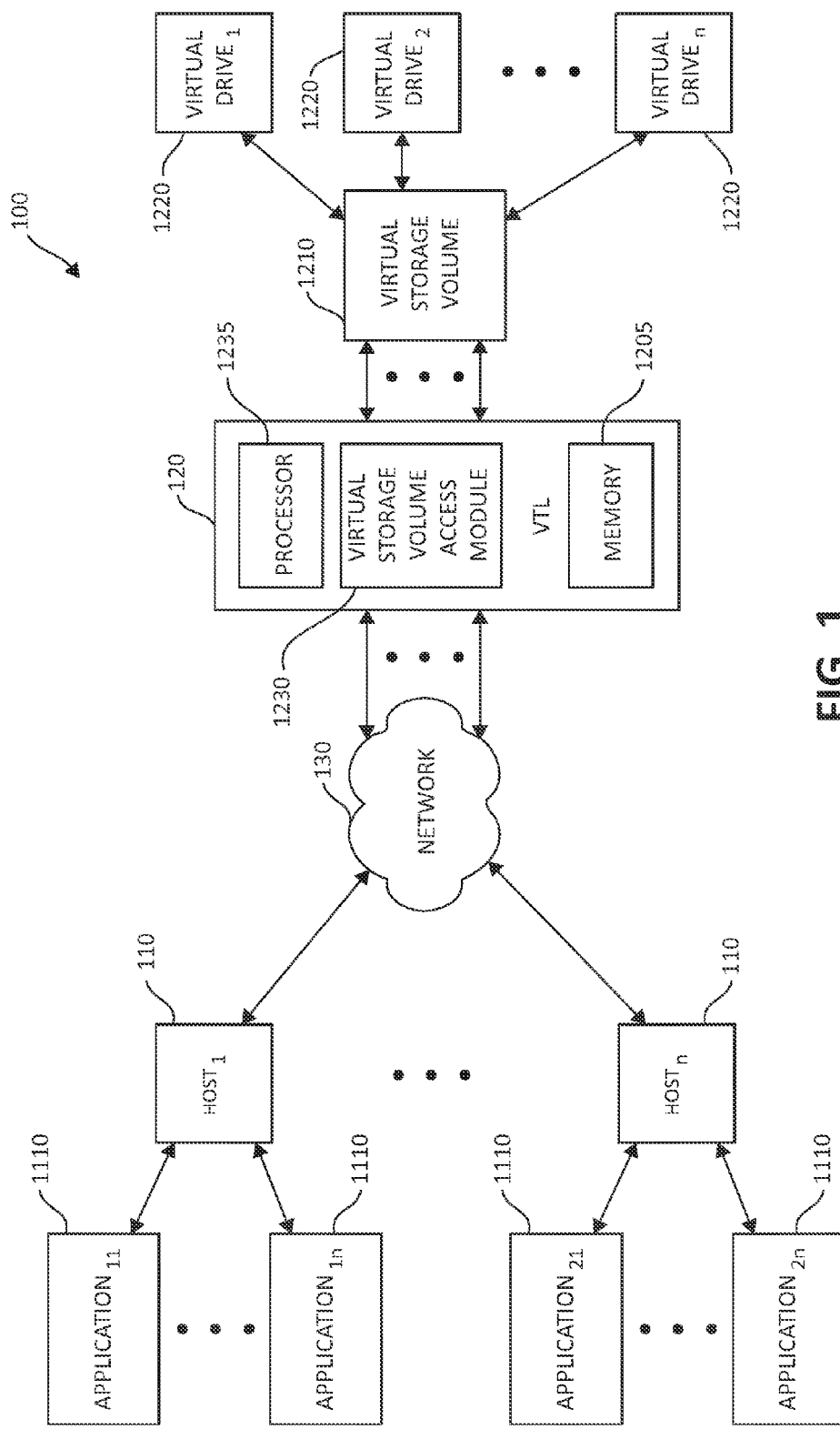
FIG. 1 is a block diagram of one embodiment of a system for concurrently accessing a virtual tape library (VTL) by a plurality of applications.

A virtual tape library typically stores data in one or more virtual storage volumes for backup and/or recovery purposes. These tape libraries are termed "virtual" because they emulate, in software, the functionality of an actual tape library. Typically, physical tape libraries include multiple physical volumes of storage tape. Each volume of storage tape is stored in a physical tape slot. When an application (or host) wants to read data from and/or write data to a volume of storage tape, the volume of storage tape is removed from its physical tape slot and placed in a physical tape drive. Only when the volume of storage tape is in the physical tape drive can data be read from and/or written to the volume of storage tape. A physical volume of storage tape is mounted in a single physical tape drive and accessed by a single application or host. While this is an effective way of storing data, the physical nature of the physical tape library increases the amount of time it takes to access the volumes of storage tape. To decrease the time it takes to access data, the functionality of the physical tape library has been emulated in a storage disk and is termed a "virtual" tape library.

In a virtual tape library, a storage disk is partitioned into multiple volumes (e.g., virtual volumes of storage tape) termed "virtual storage volumes" where data is stored and presented to the application as a physical volume of storage tape. When data needs to be read from and/or written to the virtual storage volume, the virtual storage volume is "mounted" to a virtual drive (i.e., corresponds to placing the physical volume of storage tape in the physical tape drive in the "virtual" world) so that the data can be read from and/or written to the virtual storage volume. Since a virtual tape library utilizes a storage disk instead multiple volumes of storage tape, the virtual tape library operates much faster than a physical tape library. However, because a virtual tape library typically mimics the operation of a physical tape library, contemporary virtual tape libraries do not operate as quickly as they otherwise could. Specifically, because contemporary virtual storage volumes can only be mounted in a single virtual storage drive, only one application can access the virtual storage volume at a time. That is, only one application at a time is able to read data from the virtual storage volume. In addition, other applications are prevented from reading data from and/or writing data to the virtual storage volume while another application is reading data from and/or writing data to the virtual storage volume.

The embodiments discussed below provide systems and methods for concurrently accessing a virtual tape library (VTL) by a plurality of applications. Also provided are physical computer storage mediums (an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) storing computer code for concurrently accessing a VTL by a plurality of applications.

Turning now to the figures, FIG. 1 is a block diagram of one embodiment of a system 100 for concurrently accessing a VTL by multiple applications (e.g., file servers, data servers, databases, and/or other applications capable of reading and writing data). At least in the illustrated embodiment, system 100 comprises one or more hosts 110 (e.g., $host_1$-$host_n$) coupled to a VTL 120 via a network 130 (e.g., a storage area network (SAN), a local area network (LAN), a wide area network (WAN), the Internet, and the like networks).

Each host 110 may be any computing system and/or computing device capable of functioning as a server and/or one or more device virtual drives. As illustrated in FIG. 1, each host 110 is coupled to one or more computing devices or applications 1110 (e.g., $application_{11}$-$application_{1n}$, and $application_{21}$-$application_{2n}$). Applications 1110 are each configured to read data from and/or write data to one or more virtual storage volumes (e.g., virtual storage volume 1210, discussed below) stored in VTL 120. Applications 1110 are each configured to transmit a notice (e.g., a ping, a system call, which operating system dependent, etc.) to its respective host 110 that it desires to read data from and/or write data to virtual storage volume 1210.

Each host 110 is configured to receive the notice from applications 1110 and transmit requests for the applications 1110 to access virtual storage volume 1210 in VTL 120. The requests from hosts 110 to VTL 120 are either a shared access request (e.g., a read request) or a shared-exclusive access request (e.g., a write request or a write/read request), both of which are discussed below.

VTL 120, at least in the illustrated embodiment, comprises a memory 1205 partitioned into at least one virtual storage volume 1210, a plurality of virtual drives 1220 (e.g., virtual $drive_1$, virtual $drive_2$, . . . virtual $drive_n$), a virtual storage volume access module 1230, and a processor 1235 coupled to one another. Memory 1205 may be any type of memory known in the art or developed in the future. Examples of memory 1210 include, but are not limited to a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Virtual storage volume 1210 resides in a "home slot" within memory 1205. In addition, each time an application 1110 desires to read data from and/or write data to virtual storage volume 1210, virtual storage volume 1210 is "mounted" to a virtual drive 1220 such that virtual storage volume 1210 may be concurrently mounted to multiple virtual drives 1220 in addition to residing in the home slot for virtual storage volume 1210.

Each virtual drive 1220 is capable of having virtual storage volume 1210 mounted to it such that an application 1110 is capable of reading data from and/or writing data to virtual storage volume 1210. Specifically, virtual storage volume 1210 is capable of being concurrently mounted in multiple virtual drives 1220, as well as, concurrently residing in the home slot for virtual storage volume 1210. Write and/or read access to virtual storage volume 1210 mounted in each virtual drive 1220 is controlled by computer code stored in virtual storage volume access module 1230, which is executed by processor 1235.

Virtual storage volume access module 1230 comprises computer code that, when executed by processor 1235, causes processor 1235 to perform the functions described below. That is, virtual storage volume access module 1230 comprises computer code that causes processor 1235 to perform a method that enables two or more applications 1110 to concurrently access VTL 120.

In one embodiment, processor 1235 is configured to receive requests for applications 1110 to access virtual storage volume 1210 from hosts 110. When a request to access virtual storage volume 1210 is received, processor 1235 is configured to determine if an application holds exclusive access to virtual storage volume 1210. If an application holds exclusive access to virtual storage volume 1210, processor 1235 is configured to deny the request.

If an application does not hold exclusive access to virtual storage volume 1210, processor 1235 is configured to determine the type of request for access (e.g., a shared access request or a shared-exclusive access request) and grant or deny access to virtual storage volume 1210 based on predetermined criteria.

In one embodiment, processor 1235 is configured to grant read access (e.g., read only access) to virtual storage volume 1210 to every application 1110 for which a shared access request is received from hosts 110. In this manner, more than one application 1110 may have concurrent read access to virtual storage volume 1210. In other words, multiple applications 1110 may have read access to virtual storage volume 1210 at the same time. To accomplish this, processor 1235 is configured to mount virtual storage volume 1210 to a different virtual drive 1220 each time an application 1110 is granted read access to virtual storage volume 1210 such that virtual storage volume 1210 is mounted to multiple virtual drives 1220 at the same time.

In another embodiment, processor 1235 is configured to only allow one application 1110 at a time to have write access or write/read access to virtual storage volume 1235. In this embodiment, processor 1235 is configured to make a further determination in response to determining that a shared-exclusive access request has been received from a host 110 for a particular application 1110. Specifically, when processor 1235 receives a shared-exclusive access request from a particular application 1110, processor 1235 is configured to determine if another application 1110 currently holds shared-exclusive access to virtual storage volume 1210. If another application 1110 currently holds shared-exclusive access to virtual storage volume 1210, processor 1235 is configured to deny the shared-exclusive access request from the particular application 1110. If another application 1110 does not currently hold shared-exclusive access to virtual storage volume 1210, processor 1235 is configured to grant read and write access to virtual storage volume 1210 to the particular application 1110 and deny subsequent shared-exclusive access requests for virtual storage volume 1210 while the particular application 1110 holds shared-exclusive access to virtual storage volume 1210. After write access or write/read access is granted to the particular application 1110, processor 1235 is configured to mount virtual storage volume 1210 to one of virtual drives 1220 and the application 1110 is able to write data to virtual storage volume 1210.

Since virtual storage volume 1210 is capable of being concurrently mounted in different virtual drives 1220, multiple applications 1110 are capable of reading the data in virtual storage volume 1210 at the same time. In addition, because virtual storage volume 1210 is concurrently mounted in different virtual drives 1220, an application 1110 is also capable of writing data to virtual storage volume 1210 while one or more other applications 1110 is/are reading the data in virtual storage volume 1210.

Although FIG. 1 illustrates VTL 120 as comprising one virtual storage volume 1210, various other embodiments of VTL 120 comprise more than one storage volume. In these embodiments, processor 1235 is capable of granting or denying write and read access to multiple virtual storage volumes in the same manner as virtual storage volume 1210 discussed above.

Figure 2:
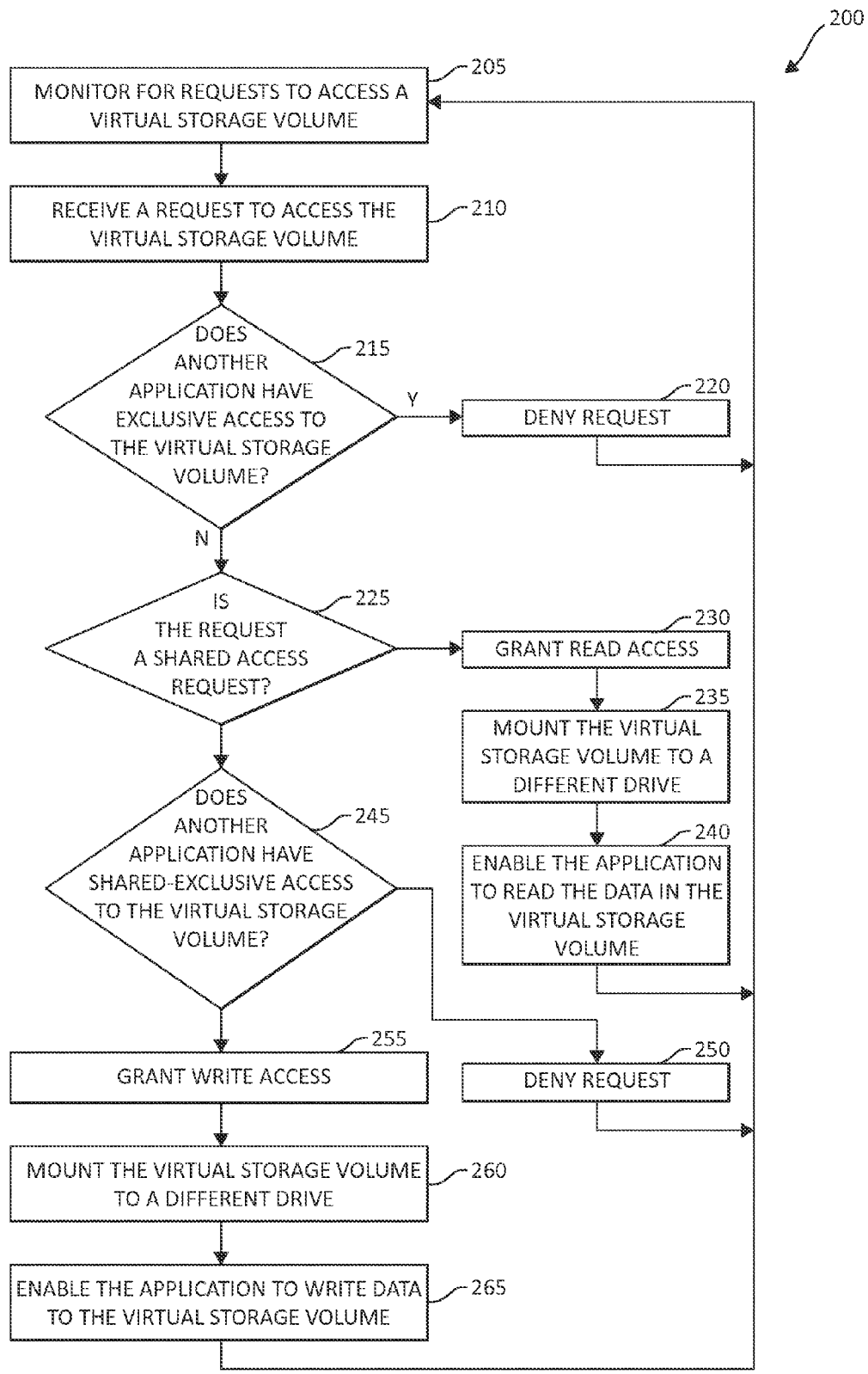
FIG. 2 is a flow diagram of one embodiment of a method for concurrently accessing a VTL by a plurality of applications.

Turning now to FIG. 2, FIG. 2 is a flow diagram of one embodiment of a method 200 for concurrently accessing a VTL (e.g., VTL 120) by a plurality of applications (e.g., applications 1110). At least in the illustrated embodiment, method 200 begins by a processor (e.g., processor 1235) monitoring for requests to access a virtual storage volume (e.g., virtual storage volume 1210) in the VTL (block 205).

Method 200 continues by receiving a request to access the virtual storage volume (block 210). A query is then made to determine if another application has exclusive access to the virtual storage volume (block 215). For example, an application consistent with the applications discussed in the above "Background of the Invention" section may hold exclusive access to the virtual storage volume.

If another application has exclusive access to the virtual storage volume, the request is denied (block 220) and method 200 continues to monitor for requests to access the virtual storage volume (block 205). If another application does not have exclusive access to the virtual storage volume, method 200 continues by determining if the request is a shared access request (e.g., a request to read data in the virtual storage volume) (block 225).

If the request is a shared access request, method 200 includes granting the request (block 230), mounting the virtual storage volume to a different virtual drive (e.g., virtual drive 1220) than other applications (block 235), and enabling the application to read the data in the virtual storage volume via the virtual drive (block 240). In this manner, multiple applications are capable of accessing the virtual storage volume via different virtual drives to read the data in the virtual storage volume at the same time. Method 200 then continues to monitor for requests to access the virtual storage volume (block 205).

If the request is not a shared access request (e.g., is a shared-exclusive access request (e.g., a request to write data to or read/write data to the virtual storage volume)), method 200 then determines if another application currently holds shared-exclusive access to the virtual storage volume (block 245). If another application does not currently hold shared-exclusive access to the virtual storage volume, method 200 includes denying the request (block 250). Method 200 then continues to monitor for requests to access the virtual storage volume (block 205).

If another application does not currently hold shared-exclusive access to the virtual storage volume, method 200 includes granting the request (block 255), mounting the virtual storage volume to a virtual drive (block 260), and enabling the application to write data to or read/write data to the virtual storage volume via the virtual drive (block 265). Method 200 then continues to monitor for requests to access the virtual storage volume (block 205).

Figure 3:
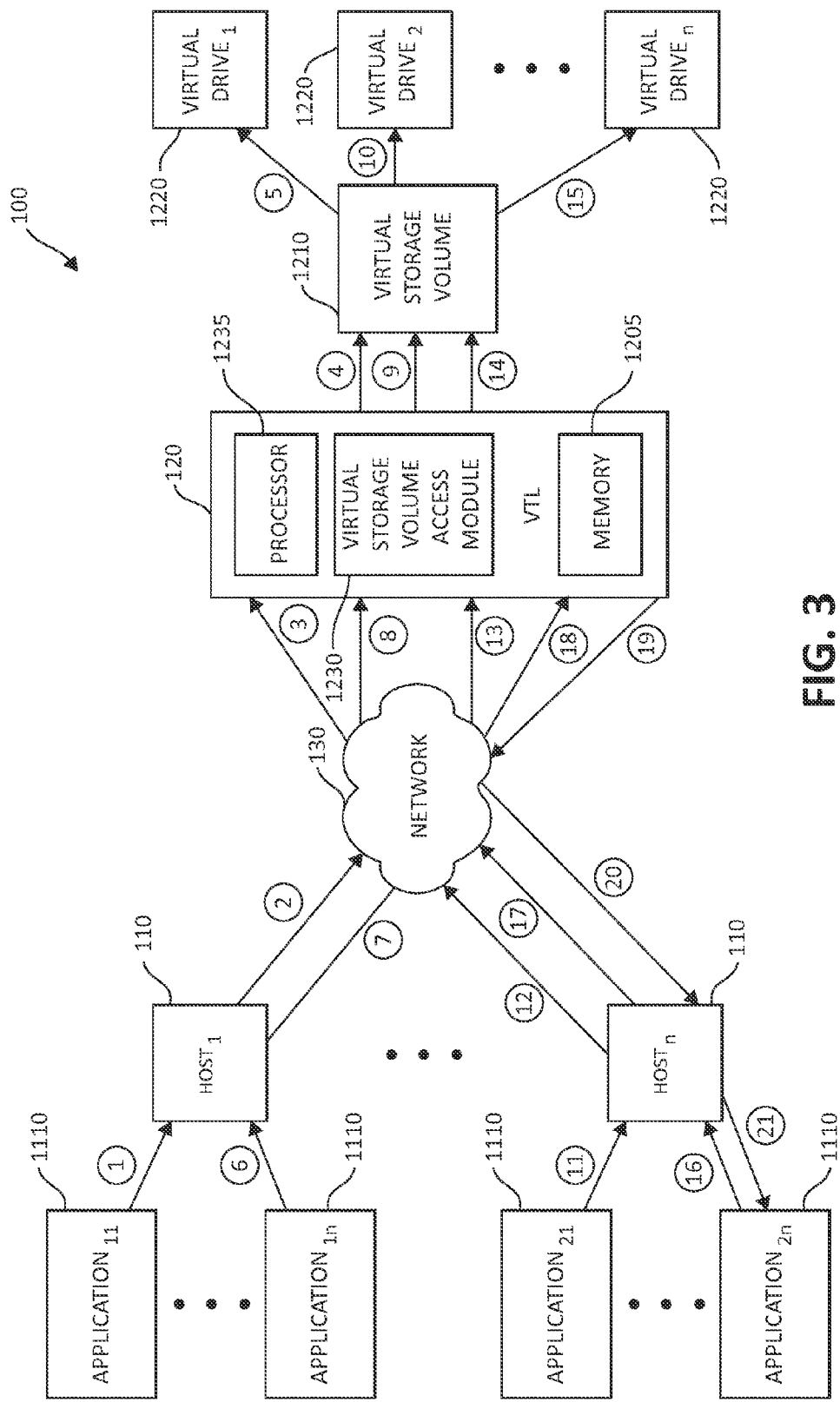
FIG. 3 is a block diagram illustrating the input/output controls of the system of FIG. 1.

Turning now to FIG. 3, FIG. 3 is a block diagram illustrating one example of the input/output control sequence of system 100. In this example, a first application 1110 (e.g., application$_{11}$) transmits a request (e.g., a system call) at time 1 to a host (e.g., host$_1$) that application$_{11}$ desires to, for example, read data from a virtual storage volume. At time 2, host$_1$ transmits a shared access request via a system call through network 130 to VTL 120, which is received by VTL 120 at time 3. In response thereto, processor 1235 determines if another application has exclusive access to the virtual storage volume. In this example, another application does not have exclusive access to this virtual storage volume so processor 1235 retrieves the virtual storage volume at time 4. Processor 1235 then mounts the virtual storage volume to a virtual drive (e.g., virtual drive$_1$) at time 5. Application$_{11}$ is then able to read data from the virtual storage volume.

Subsequently, a second application 1110 (e.g., application$_{1n}$) transmits a request at time 6 to host$_1$ that application$_{1n}$ desires to, for example, write data to the virtual storage volume. At time 7, host$_1$ transmits a shared-exclusive access request via a system call through network 130 to VTL 120, which is received by VTL 120 at time 8. In response thereto, processor 1235 retrieves the virtual storage volume at time 9. Processor 1235 then mounts the virtual storage volume to a different virtual drive (e.g., virtual drive$_2$) at time 10. Application$_{1n}$ is then able to write data to the virtual storage volume while application$_{11}$ is reading data from the virtual storage volume.

Next, a third application 1110 (e.g., application$_{21}$) transmits a request at time 11 to a host (e.g., host$_2$) that application$_{21}$ desires to, for example, read data from the virtual storage volume. At time 12, host$_2$ transmits a shared access request via a system call through network 130 to VTL 120, which is received by VTL 120 at time 13. In response thereto, processor 1235 retrieves the virtual storage volume at time 14. Processor 1235 then mounts the virtual storage volume to a different virtual drive (e.g., virtual drive$_n$) at time 15. Application$_{21}$ is then able to read data from the virtual storage volume while application$_{1n}$ is reading/writing data to the virtual storage volume and while application$_{11}$ is reading data from the virtual storage volume.

Subsequently, a fourth application 1110 (e.g., application$_{2n}$) transmits a request at time 16 to host$_2$ that application$_{2n}$ desires to, for example, write data to the virtual storage volume. At time 17, host$_2$ transmits a shared-exclusive access request via a system call through network 130 to VTL 120, which is received by VTL 120 at time 18. In response thereto, processor 1235 determines that another application (i.e., application$_{1n}$) currently holds shared-exclusive access to the virtual storage volume and returns, at time 19, a request denial through network 130 to host$_2$, which is received by host$_2$ at time 20. Host$_2$ then informs application$_{2n}$ that the request has been denied at time 21. Here, application$_{2n}$ is not able to write data to the virtual storage volume because application$_{1n}$ has shared-exclusive access to the virtual storage volume. However, application$_{11}$ and application$_{21}$ are able to concurrently read the virtual storage volume via virtual drive$_1$ and virtual drive$_2$, respectively, and application$_{1n}$ is able to concurrently write data to the virtual storage volume, via virtual drive, while application$_{11}$ and application$_{21}$ are concurrently reading data from the virtual storage volume.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A virtual tape library (VTL) in communication with a plurality of applications via one or more hosts, the VTL comprising:
  memory partitioned into a plurality of virtual storage volumes;
  a plurality of virtual drives coupled to the memory; and a processor coupled to the memory and the plurality of virtual drives, the processor configured to:
- enable each application to concurrently access a virtual storage volume via one of the plurality of virtual drives in a first access mode or a second access mode,
- mount the virtual storage volume to a different respective drive each time an application accesses the virtual storage volume in the first access mode and the second access mode such that the virtual storage volume is simultaneously mounted in a plurality of drives, and
- place the virtual storage volume in a home slot each time an application accesses the virtual storage volume in the first access mode, the second access mode, or both such that the virtual storage volume simultaneously resides in the home slot and is simultaneously mounted in the plurality of drives.

2. The VTL of claim 1, wherein the first mode is a shared access mode that enables any number of applications to concurrently access the virtual storage volume to read data in the virtual storage volume.

3. The VTL of claim 1, wherein the second mode is a shared-exclusive mode that enables an application to access the virtual storage volume to write data to the virtual storage volume.

4. The VTL of claim 1, wherein:
- the first mode is a shared access mode that enables any number of applications to concurrently access the virtual storage volume to read data in the virtual storage volume, and
- the second mode is a shared-exclusive access mode that enables one of the applications to access the virtual storage volume to write data to the virtual storage volume concurrent with the any number of applications concurrently accessing the virtual storage volume to read data in the virtual storage volume.

5. The VTL of claim 1, wherein the processor is further configured to:
- enable a first application to access the virtual storage volume via a first virtual drive in the first mode, the first mode enabling the first application to read data in the virtual storage volume;
- enable a second application to access the virtual storage volume via a second virtual drive in the first mode, the first mode enabling the second application to read data in the virtual storage volume such that the first application and the second application are concurrently reading data in the virtual storage volume; and
- enable a third application to access the virtual storage volume via a third virtual drive in the second mode, the second mode enabling the third application to write data to the virtual storage volume such that the first application and the second application are each concurrently reading data in the virtual storage volume and concurrent with the third application writing data to the virtual storage volume.

6. The VTL of claim 1, wherein the processor is further configured to:
- determine if an application holds exclusive access to the virtual storage volume; and
- deny access to all other applications if the application holds the exclusive access to the virtual storage volume.

7. A method for concurrently accessing a virtual tape library (VTL) in communication with a plurality of applications via one or more hosts, wherein the VTL comprises memory partitioned into a plurality of virtual storage volumes, a plurality of virtual drives coupled to the memory, and a processor coupled to the memory and the plurality of virtual drives, the method comprising:
- receiving, by the processor, a first request for a first application to access a virtual storage volume to write data to or read data from the virtual storage volume at a time;
- granting the first request if another application does not hold exclusive access to the virtual storage volume;
- receiving, by the processor, a second request for a second application to concurrently access the virtual storage volume to write data to or read data from the virtual storage volume at a subsequent time;
- determining if the first request and the second request are compatible requests;
- accepting or denying the second request based on the determination;
- mounting the virtual storage volume to a first drive if the first request is granted to the first application; and
- placing the virtual storage volume in a home slot such that the virtual storage volume simultaneously resides in the home slot and is mounted to the first drive.

8. The method of claim 7, wherein the first request is a read request and the second request is a read request, the method further comprising:
- determining that the first request and the second request are compatible; and
- accepting the second request such that the first application and the second application are able to concurrently read the virtual storage volume.

9. The method of claim 7, wherein the first request is a read request and the second request is a write request or the first request is a write request and the second request is a read request, the method further comprising:
- determining that the first request and the second request are compatible; and
- accepting the second request such that the first application and the second application are able to concurrently read and write to the virtual storage volume.

10. The method of claim 7, wherein the first request is a write request and the second request is a write request, the method further comprising:
- determining that the first request and the second request are non-compatible; and
- rejecting the second request in response thereto.

11. The method of claim 7, further comprising:
- determining that a third application holds exclusive access to the virtual storage volume; and
- denying access to the first application and the second application in response thereto.

12. The method of claim 7, further comprising accepting any request from an application to concurrently access the virtual storage volume to read data from the virtual storage volume.

13. A physical computer storage medium comprising a computer program product method for concurrently accessing a virtual tape library (VTL) in communication with a plurality of applications via one or more hosts, wherein the VTL comprises memory partitioned into a plurality of virtual storage volumes, a plurality of virtual drives coupled to the memory, and a processor coupled to the memory and the plurality of virtual drives, the physical computer storage medium comprising:
- computer code for receiving, by the processor, a first request for a first application to access a virtual storage volume to write data to or read data from the virtual storage volume;

computer code for granting the first request if another application does not hold exclusive access to the virtual storage volume;

computer code for receiving, by the processor, a second request for a second application to concurrently access the virtual storage volume to write data to or read data from the virtual storage volume;

computer code for determining if the first request and the second request are compatible requests;

computer code for accepting or denying the second request based on the determination;

computer code for mounting the virtual storage volume to a first drive if the first request is granted to the first application; and computer code for placing the virtual storage volume in a home slot such that the virtual storage volume simultaneously resides in the home slot and is mounted to the first drive.

14. The physical computer storage medium of claim 13, wherein the first request is a read request and the second request is a read request, the physical computer storage medium further comprising:

computer code for determining that the first request and the second request are compatible; and computer code for accepting the second request such that the first application and the second application are able to concurrently read the virtual storage volume.

15. The physical computer storage medium of claim 13, wherein the first request is a read request and the second request is a write request or the first request is a write request and the second request is a read request, the physical computer storage medium further comprising:

computer code for determining that the first request and the second request are compatible; and computer code for accepting the second request such that the first application and the second application are able to concurrently read and write to the virtual storage volume.

16. The physical computer storage medium of claim 13, wherein the first request is a write request and the second request is a write request, the physical computer storage medium further comprising:

computer code for determining that the first request and the second request are non-compatible; and computer code for rejecting the second request.

17. The physical computer storage medium of claim 13, further comprising:

computer code for determining that a third application holds exclusive access to the virtual storage volume; and computer code for denying access to the first application and the second application in response thereto.

* * * * *